(No Model.)
M. HOYT.
HANDLE FOR VELOCIPEDES.
No. 436,978.　　　　　　　　Patented Sept. 23, 1890.
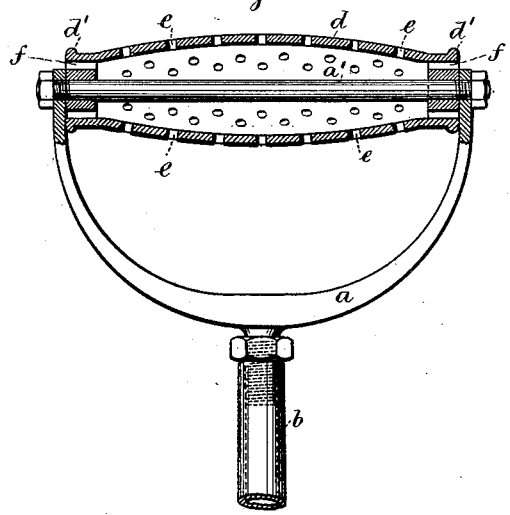
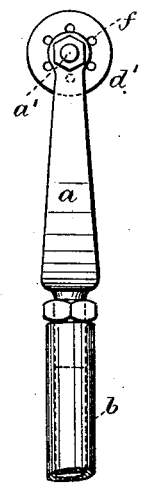
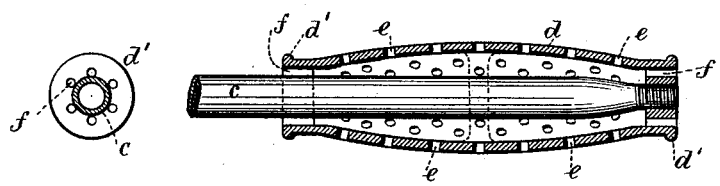
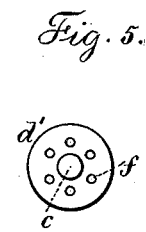
Witnesses
J. Staib
Chas H Smith
Inventor
Montraville Hoyt
per Lemuel W. Serrell
Atty.

United States Patent Office.

MONTRAVILLE HOYT, OF JAMAICA, NEW YORK, ASSIGNOR TO HIMSELF AND GEORGE R. BIDWELL, OF SAME PLACE.

HANDLE FOR VELOCIPEDES.

SPECIFICATION forming part of Letters Patent No. 436,978, dated September 23, 1890.

Application filed April 14, 1890. Serial No. 347,741. (No model.)

*To all whom it may concern:*

Be it known that I, MONTRAVILLE HOYT, a citizen of the United States, residing at Jamaica, in the county of Queens and State of New York, have invented a new and useful Improvement in Handles for Velocipedes; and the following is declared to be a full, clear, and exact description thereof.

Handles for velocipedes of modern construction are usually made of india-rubber in one or more pieces, the handle being generally swelled at the middle portion and tapering to both ends. The ends are made heavier and thicker than the shell, and the ends of the handle-bar and the pins of the spade-grip pass centrally through the rubber handles, and said handles are usually held in place by small clamping-nuts. These handles are liable, especially in warm weather, to sweat the hands of the rider of the velocipede, and much discomfort often arises from this cause; and the object of my invention is to obviate the same by making a handle which will be ventilated, so that the hands remain cool.

My invention is a new article of manufacture, and the same consists in a hollow handle for velocipedes or other cycles, made of one or more pieces of hard rubber, celluloid, zylonite, or other similar material that is molded from a plastic mass, and in which the surface of the shell forming the handle is perforated with numerous small holes, preferably at regular intervals, in which, also, the ends are longitudinally perforated in line with the bar or pin passing through the handle, and these perforations give access for the passage of air through the handle, so that any moisture of the hands in grasping the same can evaporate and pass off, thereby preventing the heretofore objectionable sweating of the hands.

In the drawings, Figure 1 is a longitudinal section of my improved handle and an elevation of the spade-grip to which the same is connected. Fig. 2 is an end view of the same. Fig. 3 is a longitudinal section of my improved handle and an elevation of the end of a handle-bar to which the same is connected. Fig. 4 is an end view of the handle shown in Fig. 3 and a section of the bar, and Fig. 5 is an elevation of the outer end of the handle.

$a$ represents the bow-shaped metal portion forming the spade-grip, and $b$ the handle-bar of the velocipede, to which the same is secured in any desired manner, and $c$ represents the end of the curved velocipede handle-bar, and as these parts are of well-known construction they do not require further description.

$d$ represents my improved handle, which is made hollow of hard rubber, celluloid, zylonite, or other similar material molded according to well-known methods, the same being preferably enlarged or swelled at the middle portion and tapering toward both ends, the ends being made heavy and provided with openings for the pin $a'$ or handle-bar $c$.

The shell of my improved handle is radially perforated, as at $e$, with numerous regularly or irregularly placed perforations over the surface of the shell and passing through the same, and the ends $d'$ of my improved handle are perforated with longitudinally-placed holes $f$, arranged circumferentially around either the pin $a'$ of the spade-grip, as seen in Fig. 1, or the handle-bar $c$, as seen in Fig. 3. These perforations permit the free passage of air through the handle $d$, and the warmth of the hand of the rider, especially in the summer season, finds vent through these openings $e$ into the central cavity of the handle and passes out through the end openings $f$, thereby establishing a free circulation and ventilation. The hand of the rider in all probability will not entirely cover the shell of the handle $d$, so that some of the perforations $e$ would answer for the purposes of ventilation in a similar manner to the end perforations $f$.

I prefer to construct my improved handle with a shell of slightly greater thickness than the handles heretofore made, the object of which is to maintain the strength of the handle, and I may prefer to employ a central bridge or diaphragm (shown in Fig. 3 by dotted lines) to strengthen the central part of the handle and divide the same into two internal cavities.

My improved handle may be made of metal similarly perforated; but the same does not possess the advantages in use of a handle made of rubber or similar material.

I claim as my invention—

1. As a new article of manufacture, a hollow ventilating-handle for velocipedes, having central openings in the ends for the attaching pin or bar, and having perforations passing through the shell and longitudinal holes through the ends of the shell parallel with the axis of the handle, substantially as set forth.

2. As a new article of manufacture, a hollow ventilating-handle for velocipedes, formed of rubber, celluloid, zylonite, or other similar material in one piece swelled at the middle portion and tapering to both ends, having central openings in the ends for the attaching pin or bar, numerous radial perforations passing through the shell of the handle, and holes in the respective ends parallel with the axis of the handle, substantially as set forth.

3. As a new article of manufacture, a hollow ventilating-handle for velocipedes, formed of rubber, celluloid, zylonite, or similar material in one piece with thick bearing ends, and having central openings therein for the attaching pin or bar, numerous radial perforations through the shell of the handle, and holes through the respective ends of the handle parallel with and surrounding the axis thereof, substantially as set forth.

Signed by me this 31st day of March, A. D. 1890.

MONTRAVILLE HOYT.

Witnesses:
GEO. T. PINCKNEY,
HAROLD SERRELL.